United States Patent
Jackson et al.

(10) Patent No.: US 11,970,124 B2
(45) Date of Patent: *Apr. 30, 2024

(54) OCCUPANCY SENSOR FOR WHEELED MOBILITY DEVICE RESTRAINT

(71) Applicant: Valeda Company, LLC, Oakland Park, FL (US)

(72) Inventors: Damian Jackson, Tamarac, FL (US); Edgardo Cardona, Pompano Beach, FL (US)

(73) Assignee: Valeda Company, LLC, Oakland Park, FL (US)

( * ) Notice: Subject to any disclaimer, the term of this patent is extended or adjusted under 35 U.S.C. 154(b) by 309 days.

This patent is subject to a terminal disclaimer.

(21) Appl. No.: 17/220,597

(22) Filed: Apr. 1, 2021

(65) Prior Publication Data

US 2021/0221313 A1 Jul. 22, 2021

Related U.S. Application Data

(63) Continuation of application No. 16/663,469, filed on Oct. 25, 2019, now Pat. No. 10,981,528.
(Continued)

(51) Int. Cl.
   *B60P 3/00* (2006.01)
   *A61G 3/08* (2006.01)
   (Continued)

(52) U.S. Cl.
   CPC ...... *B60R 21/01516* (2014.10); *A61G 3/0808* (2013.01); *B60P 3/079* (2013.01); *B60R 21/0155* (2014.10)

(58) Field of Classification Search
   CPC ........... B60R 21/01516; B60R 21/0155; B60P 3/079; A61G 3/0808
   (Continued)

(56) References Cited

U.S. PATENT DOCUMENTS 4,093,303 A * 6/1978 Nelson ................. A61G 3/0808
                                              410/20
4,688,843 A   8/1987 Hall
                        (Continued)

FOREIGN PATENT DOCUMENTS

EP     2570105 A1 *  3/2013   ............... A61G 3/08
GB     2527120 A     12/2015
WO  2017205696 A1   11/2017

OTHER PUBLICATIONS

U.S. Appl. No. 15/284,441, filed Jul. 9, 2019, Cardona et al.
International Search Report and Written Opinion dated Feb. 5, 2020 in PCT/US2019/057753.

*Primary Examiner* — Stephen T Gordon
(74) *Attorney, Agent, or Firm* — Daniel Tallitsch

(57) ABSTRACT

An occupancy sensor is provided for detecting the occupancy status of a wheeled mobility device securement system. The occupancy sensor may additionally confirm adequate "tightness" of the wheeled mobility device securement system and/or provide an indication of the magnitude of "tightness." In one embodiment, the occupancy sensor comprises a spring-loaded follower that breaks the straight-line path of a wheeled mobility device tie down as it travels between two touch points. The follower is displaceable from an extended position to a compressed position in response to the magnitude of tension applied to the tie down. Proximity sensors are used to detect the displacement distance of the follower, thereby providing an indication of occupancy, adequate securement, and/or the magnitude of tension.

23 Claims, 2 Drawing Sheets

Related U.S. Application Data

(60) Provisional application No. 62/751,277, filed on Oct. 26, 2018.

(51) Int. Cl.
*B60P 3/079* (2006.01)
*B60R 21/015* (2006.01)

(58) Field of Classification Search
USPC ... 410/11, 7–10, 12, 18, 19, 21–23, 30, 104, 410/105, 150
See application file for complete search history.

(56) References Cited

U.S. PATENT DOCUMENTS

| | | | |
|---|---|---|---|
| 6,287,060 B1 | 9/2001 | Girardin | |
| 6,406,230 B1 | 6/2002 | Mason et al. | |
| 6,524,039 B1 * | 2/2003 | Magnuson | A61G 3/0808 410/23 |
| 6,872,037 B2 | 3/2005 | Girardin | |
| 6,966,733 B2 * | 11/2005 | Craft | A61G 3/0808 410/23 |
| 9,061,655 B2 * | 6/2015 | Verachtert | A61G 3/08 |
| 9,107,786 B2 | 8/2015 | Girardin et al. | |
| 10,071,004 B2 | 9/2018 | Goss et al. | |
| 10,130,529 B2 * | 11/2018 | Gale | A61G 3/0808 |
| 10,981,528 B2 | 4/2021 | Jackson et al. | |
| 2006/0249617 A1 | 11/2006 | Cardona | |
| 2008/0247837 A1 * | 10/2008 | Cardona | A61G 3/0808 410/23 |
| 2018/0338875 A1 * | 11/2018 | Cardona | B66F 7/243 |

* cited by examiner

OCCUPANCY SENSOR FOR WHEELED MOBILITY DEVICE RESTRAINT

CROSS-REFERENCE TO OTHER APPLICATIONS

This application is a continuation of U.S. patent application Ser. No. 16/663,469, filed on Oct. 25, 2019, which claims priority to U.S. Provisional Patent Application No. 62/751,277, filed on Oct. 26, 2018, both of which are incorporated herein by reference.

In addition, the disclosures of U.S. Pat. No. 10,071,004, U.S. patent application Ser. No. 15/284,441, U.S. Provisional Patent Application No. 62/236,932, and U.S. Pat. No. 9,107,786 are incorporated herein by reference.

BACKGROUND

Technical Field

The embodiments described and claimed herein relate generally to a securement system comprising one or more retractors for securing a mobility device (e.g. wheelchair, scooter, stretcher, etc.), and providing an occupancy sensor for detecting an occupancy status of the securement system. The securement system may use a "tensioner" that induces tension into a restraint to provide greater stabilization while the mobility device is being transported in a vehicle (although it could be used to transport it outside of a vehicle). The tensioner induces tension into one or more restraints (which are attached between a point on a mobility device and a point on a vehicle). In one embodiment, the occupancy sensor may be incorporated into the retractor, whereby the tension induced in the restraint triggers the occupancy sensor and the occupancy sensor outputs a signal indicative of an "occupied" or "secured condition" for the mobility device. In other embodiments, the occupancy sensor may be configured to not only output a signal indicative of a "occupied" or "secured condition," but may also be configured to output a signal indicative of the amount of tension induced into the restraint.

Background Art

Historically, mobility device securement systems had been designed with four restraints, one attached to each corner of the mobility device (two in front, two in rear). The restraints could be provided in the form of manual belts or self-winding and auto-locking retractors. Recently, new and more complex systems have been developed or designed with less than four attachment points (e.g., Q'Straint's Q'Pod and American Seating's Reliant). These systems have used three attachment points instead of four, and they include one or both of a tensioning device and a bumper to help stabilize the mobility device while being transported. Some in the industry have contemplated using as few as two or even one restraint, in combination with one or more tensioners and/or bumpers. To meet crash test requirements, most if not all of these new systems rely upon a combination of a tensioner and a bumper to pretension the restraints and bring the mobility device into close proximity or contact with the bumper. In some embodiments, the tensioner acts on the restraint, causing the restraint to pull the mobility device toward or into contact with a bumper. In other embodiments, the tensioner moves the bumper into contact with the mobility device, which pushes the mobility device away from the vehicle tie-down point thereby stretching the restraint. In either case, tension is induced into the restraint(s) to ensure adequate mobility device securement.

One challenge of the prior art is detecting when sufficient tension is provided to the restraint, and subsequently communicating to the vehicle operator that adequate securement has been provided. In the prior art, tensioners have been provided with an indicator (visual or audible), which alerts the user when the mobility device is 'not' secured (i.e., when the belts are completely 'loose,' and the tensioner is not being used). Notably, the prior art indicators do not provide an indication when the system is actually 'secured,' nor do they provide an indication when an adequate level of tension has been provided by the securement system. One prior art reference vaguely contemplates incorporating a load indicator that provides an audible or visual signal to alert the user when a desired tension on the belt has been reached, but does not disclose any specific methods or mechanisms for doing so.

SUMMARY OF THE PRESENT EMBODIMENTS

Clearly, the prior art devices have limitations which the present embodiments overcome and make for more effective installation and use. Without sensors that can detect when an adequate amount of tension has been provided to the restraints, current systems today often provide too much tension on the belt, possibly causing damage to the mobility device, or too little, resulting in a very uncomfortable ride since the mobility devices may be moving side to side as the vehicle is moving. The new occupancy sensor disclosed herein solves this problem by providing a sensor configured to detect when an adequate amount of tension has been provided to at least one restraint in a mobility device securement system. The sensor may be configured to provide an on/off signal (e.g., 5-0V signal, or any similar type signal), with the off signal (0V) indicating that inadequate tension has been provided, and the on signal (5V) indicating that adequate tension has been provided. In an alternate embodiment, the on signal (5V) will indicate that inadequate tension has been provided, and the off signal (0V) will indicate that adequate tension has been provided.

In one embodiment, the occupancy sensor may be disposed in, on, or adjacent a retractor (i.e., a tie down) in a mobility device securement system. A typical mobility device securement system may comprise a rear barrier with one or more rear tie downs, a bumper, a front tie down, and the tensioner. The tensioner may be placed in front of the mobility device and under or adjacent a flip seat for engagement with the front tie down. Once a mobility device is positioned inside the vehicle and in the park zone, the two rear tie down hooks are attached to the rear of the mobility device and the mobility device is steered into the final position, close to the side bumper. The mobility device is then secured with a hook at the end of the front tie down belt. Tension can be applied to the front tie down belt by cranking the handle of the tensioner. In response, the mobility device may move forward in the securement area, away from the rear barrier, thereby adding tension to the rear tie downs, and to the side toward the bumper. Once the tension on one or more of the tie down belts has reached a predetermined amount of load, the occupancy sensor will output a signal indicative of proper and adequate securement, or simply that the securement system is occupied. Alternatively, the occupancy sensor will provide an output signal that reflects the magnitude of tension in one or more of the tie down belts, which may be used by other systems, for example, to determine when the mobility device securement system has been adequately tensioned.

In one embodiment, the occupancy sensor takes the form of a spring-loaded restraint follower that breaks the path of the restraint belt as it travels from a retractor spool to a belt guide. Increasing tension on the restraint belt exerts a force on the follower, which is displaced a distance that is proportional to the tension on the restraint belt. The greater the tension on the belt, the greater the distance the sensor structure will be displaced. One or more proximity sensors may be used to detect the displacement distance of the follower. In the simplest embodiment, a single proximity sensor may be used to detect when the follower has been displaced a predetermined distance (i.e., a distance that provides confidence that adequate tension has been provided to the restraint). In more complex embodiments, a series of proximity sensors may be disposed in predetermined locations on the sensor structure to provide an indication of the changing magnitude of tension provided to the restraint belt.

The signal from the occupancy sensor can be used to provide an indication of the occupancy status of the securement system, or a visual or audible indication of adequate securement for the vehicle operator. The signal can also be sent to the vehicle controller and used to release a vehicle interlock, which would prevent operation of the vehicle until the mobility device is adequately secured.

BRIEF DESCRIPTION OF THE SEVERAL VIEWS OF THE DRAWINGS

These and other features, aspects, objects, and advantages of the embodiments described and claimed herein will become better understood upon consideration of the following detailed description, appended claims, and accompanying drawings.

Figure 1:
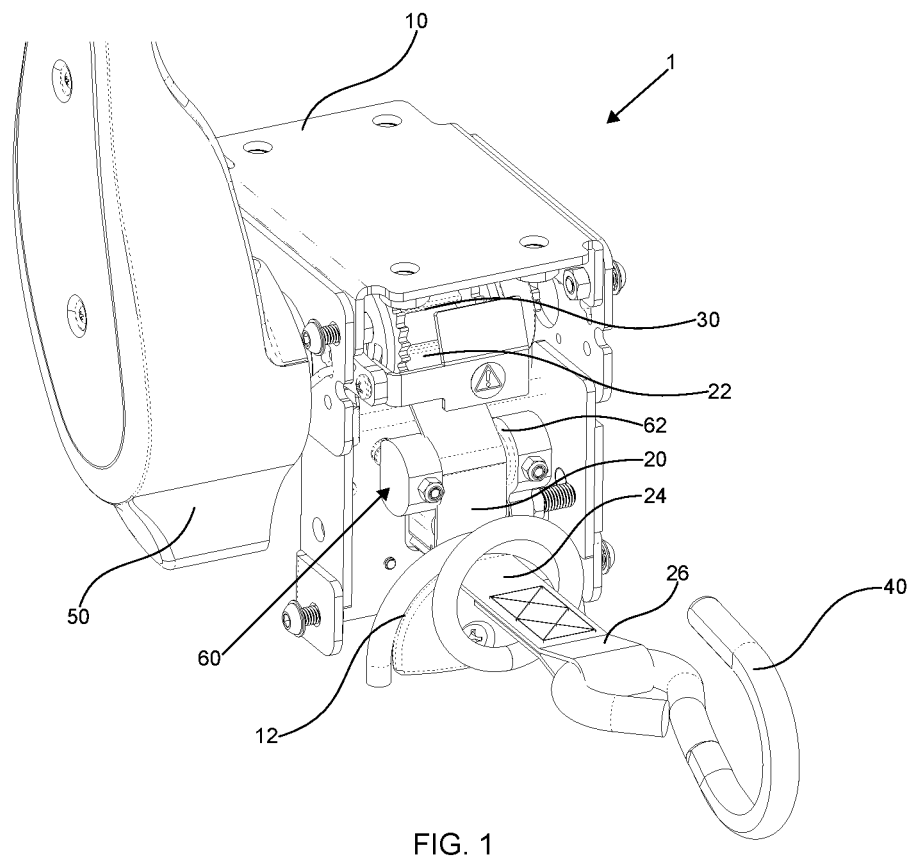
FIG. 1 is a perspective view of a first embodiment of a occupancy sensor that is incorporated into a retractor of a wheeled mobility device securement system and is in an extended position.
Figure 2:
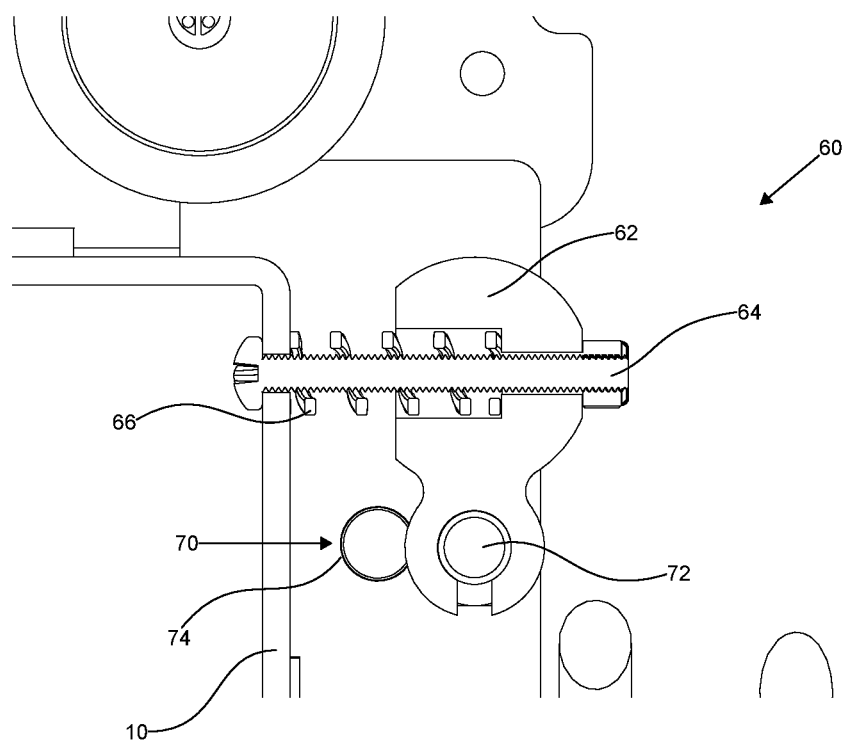
FIG. 2 is a cross sectional view of the occupancy sensor of the first embodiment in the extended position.

It should be understood that the drawings are not necessarily to scale and that the embodiments are sometimes illustrated by graphic symbols, phantom lines, diagrammatic representations and fragmentary views. In certain instances, details which are not necessary for an understanding of the embodiments described and claimed herein or which render other details difficult to perceive may have been omitted. It should be understood, of course, that the inventions described herein are not necessarily limited to the particular embodiments illustrated. Indeed, it is expected that persons of ordinary skill in the art may devise a number of alternative configurations that are similar and equivalent to the embodiments shown and described herein without departing from the spirit and scope of the claims.

Like reference numerals will be used to refer to like or similar parts from Figure to Figure in the following detailed description of the drawings.

DETAILED DESCRIPTION OF THE PRESENT EMBODIMENTS

With reference to FIGS. 1-4, a first embodiment of a retractor 1 with a retractor housing 10 is shown for use in a wheeled mobility device securement system. For purposes of clarity, the front panel of the retractor housing 10 has been removed. As is conventionally known in the art, the retractor 1 is secured to the vehicle, is auto-retracting, and comprises a restraint (e.g., a belt or cable or similar structure) 20 with: (a) a first end 22 connected to a retractor spool 30; (b) a middle portion 24 that is wound around the retractor spool 30 and extends from the retractor spool 30 through a restraint guide 12 or opening in the retractor housing 10; and (c) a second end 26 connected to a wheeled mobility device connector 40, such as a hook, for releasable attachment to the wheeled mobility device. In operation, a vehicle operator will grab and pull the connector 40, which causes the restraint 20 to unwind from retractor spool, and hook the connector 40 to the frame of the wheeled mobility device being secured.

Figure 3:
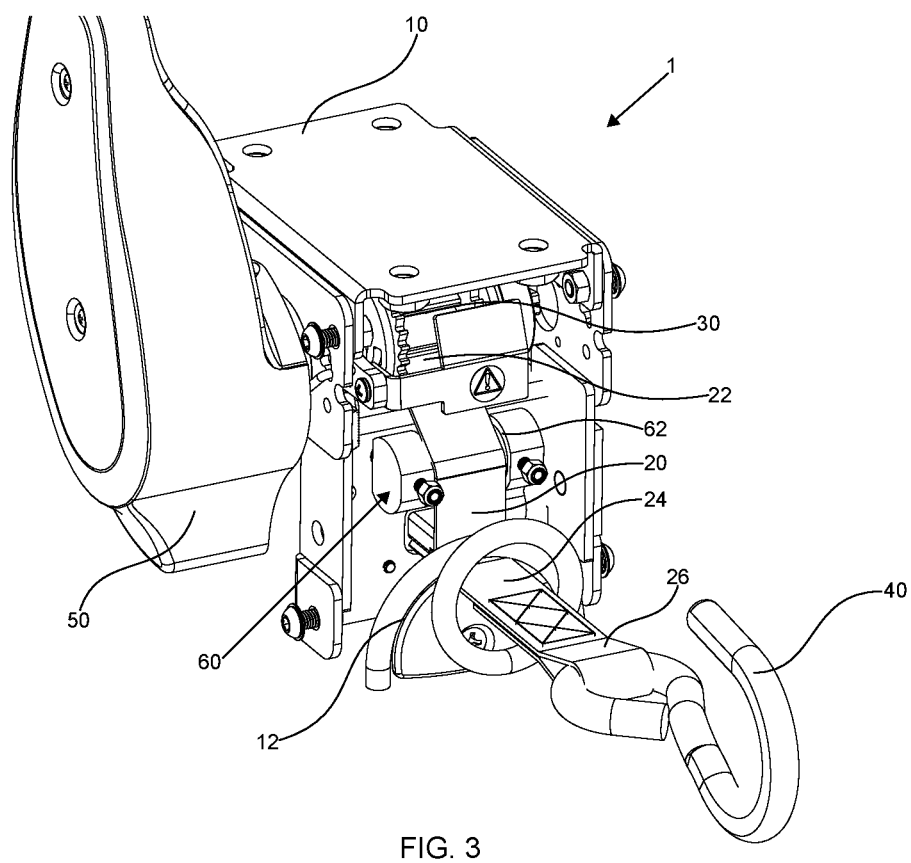
FIG. 3 is a perspective view of the occupancy sensor of the first embodiment in an compressed position; and, FIG. 4 is a cross sectional view of the occupancy sensor of the first embodiment in the compressed position.

After securing the connector 40 to the wheeled mobility device, the vehicle operator may then pre-tension the restraint 20 using various means known in the art. For example, as shown in FIGS. 1 and 3, and as described in more detail in U.S. patent application Ser. No. 15/284,441 and U.S. Provisional Patent Application No. 62/236,932, the retractor 1 may be provided with a tensioning mechanism 50 that may apply a retracting torque directly to the retractor spool 30. In the alternative, as described in U.S. Pat. No. 9,107,786, a moveable bumper may be employed to push the wheeled mobility device away from the connection point between the vehicle and the retractor 1, thereby inducing tension into the restraint 20.

An occupancy sensor 60 is provided to detect when an adequate level of tension has been provided to the restraint 20. The occupancy sensor 60 may include a spring-loaded restraint follower 62 that breaks the straight-line path of the restraint 20 as it extends between a first touch point and a second touch point. As shown in the figures, the restraint follower 62 breaks the straight-line path of the restraint 20 as it extends from the spool 30 (the first touch point) to the restraint guide 12 (the second touch point). In an alternative embodiment, the restraint follower 62 may be located outside of the housing 10 and may break the straight-line path of the restraint 20 as it extends from the restraint guide 12 (the first touch point) to the connection point on the wheeled mobility device (the second touch point). In yet another alternative embodiment, the restraint follower 62 may be provided with its own housing with a first guide and a second guide on opposite sides of the follower 62, wherein the follower 62 breaks the straight-line path between the first guide (the first touch point) and the second guide (the second touch point).

As can be readily appreciated, as additional tension is applied to the restraint 20, the restraint 20 will want to straighten out and will want to extend in a straight line from the first touch point to the second touch point. However, because the restraint follower 62 breaks the straight-line path and prevents the restraint 20 from extending in a straight line, the restraint 20 will apply a normal force to the restraint follower 62.

Figure 4:
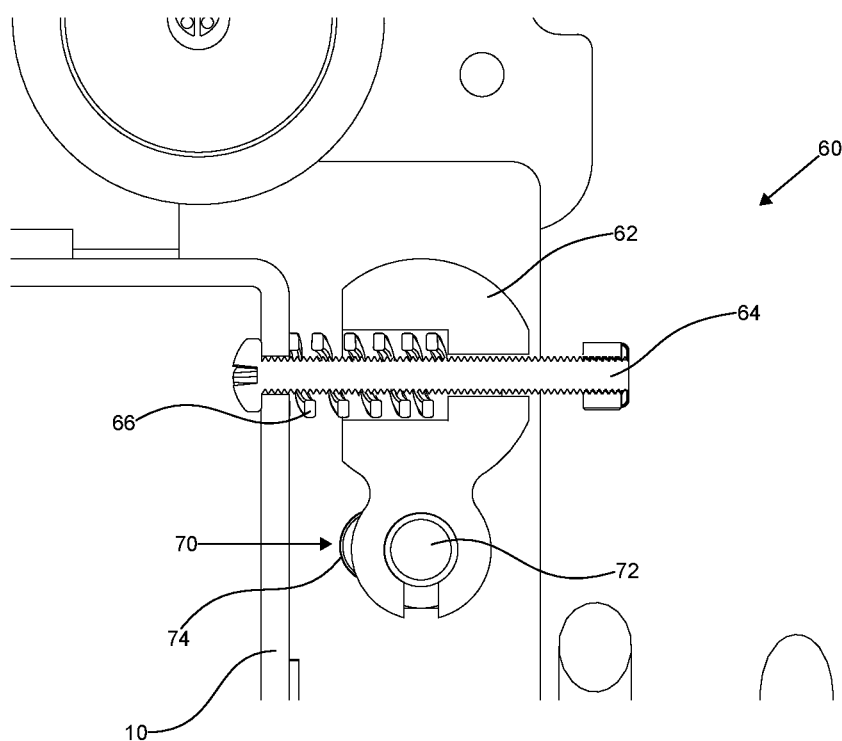

As previously mentioned, the restraint follower 62 is spring loaded and, as such, will displace a distance that is proportional to the amount of normal force applied to it by the restraint 20. More particularly, as shown, the restraint follower 62 is connected to the housing 10 via bolts 64 and springs 66. The restraint follower 62 is moveable along a straight line path, parallel with the bolts 64, from an extended position (FIG. 1-2) to a compressed position (FIGS. 3-4). The occupancy sensor 60 includes one or more proximity sensors configured to detect when the restraint follower 62 has been compressed a certain distance from the extended position. As shown, the occupancy sensor 60 comprises a magnet-based proximity sensor 70, although other types of proximity sensors may be used (e.g., sensors that use electromagnetic fields or electromagnetic radiation, such as infrared). The magnet-based proximity sensor 70 may be a magnetic reed switch that is normally open, and closes when it comes in close proximity to a magnet. Alternatively, the magnet-based proximity sensor 70 may be a magnetic reed switch that is normally closed, and opens when it comes moves out of close proximity to a magnet. As shown, the proximity sensor 70 includes a switch 74 that is fixed to the follower 62, and a magnet 72 that is fixed to the housing 10. The magnet 72 is attached to the housing 10 in a location that is predetermined, whereby the switch 74 will detect the magnet 72 when the follower 62 has been displaced a sufficient distance (as best shown in FIG. 4). When the switch 74 detects the magnet 72, the switch emits a signal that is indicative of a secured position, which may be used in other vehicle systems, for example, to alert the operators (visually or audibly) that sufficient tension has been applied to the restraints 20, or to release a vehicle interlock that prevents vehicle operation. The signal from the occupancy sensor 60 may also be used simply as an indication that the mobility device securement area is occupied and may not be used for another passenger. Note that it is contemplated that the locations of the magnet 72 and switch 74 may be reversed, wherein the switch 74 may be disposed on the housing 10 and the magnet 72 may be disposed on the follower 62.

Multiple proximity sensors may be provided, wherein each is configured to detect a different displacement distance of the follower 62. By using multiple proximity sensors that detect a different displacement, the occupancy sensor 60 will be able to provide not only an indication of the occupancy status of the securement station and an indication of whether sufficient tension has been applied, but also an indication of the magnitude of tension that has been applied to the restraint 20.

Although the inventions described and claimed herein have been described in considerable detail with reference to certain embodiments, one skilled in the art will appreciate that the inventions described and claimed herein can be practiced by other than those embodiments, which have been presented for purposes of illustration and not of limitation. Therefore, the spirit and scope of the appended claims should not be limited to the description of the embodiments contained herein.

We claim:

1. A device for detecting a status of a wheeled mobility device securement system, the device comprising:
    a restraint for securing a wheeled mobility device;
    a restraint follower being in contact with the restraint, being moveable between a first position where the restraint follower would break a path of the restraint and a second position, and being spring-biased toward the first position, whereby a tension in the restraint exerts a force on the restraint follower in the direction of the second position;
    at least one sensor for detecting a position of the restraint follower and outputting a signal indicative of the position of the restraint follower.

2. The device of claim 1, wherein the path of the restraint is a straight-line path.

3. The device of claim 2, wherein the restraint is further from the straight-line path when the restraint follower is located in the first position, as compared to the second position.

4. The device of claim 1, wherein the restraint extends from a retractor.

5. The device of claim 4, wherein the path of the restraint extends between a first touch point and a second touch point, with the restraint follower contacting the restraint between the first touch point and the second touch point.

6. The device of claim 5, wherein the first touch point is a retractor spool.

7. The device of claim 6, wherein the second touch point is a retractor guide.

8. The device of claim 6, wherein the second touch point is an opening in the retractor housing.

9. The device of claim 5, wherein the second touch point is a connection point on a wheeled mobility device.

10. The device of claim 5, wherein the first touch point is a retractor guide.

11. The device of claim 10, wherein the second touch point is a second retractor guide.

12. The device of claim 10, wherein the second touch point is a connection point on a wheeled mobility device.

13. The device of claim 1, wherein the at least one sensor is a proximity sensor.

14. The device of claim 13, wherein the proximity sensor comprises a magnet.

15. The device of claim 13, wherein the proximity sensor comprises an infrared signal.

16. The device of claim 1, whereby the at least one sensor outputs a signal when the restraint follower is displaced a predetermined distance from the first position.

17. The device of claim 1, whereby the at least one sensor comprises a series of sensors that each detect when the restraint follower is displaced a different distance.

18. A device for detecting a status of a wheeled mobility device securement system, the device comprising:
    a restraint for securing a wheeled mobility device;
    a restraint follower being in contact with the restraint, wherein a tension in the restraint exerts a force on the restraint follower;
    at least one sensor outputting a signal, wherein the signal is indicative of a magnitude of the tension in the restraint.

19. The device of claim 18, wherein the at least one sensor comprises a series of sensors wherein the signal provides an indication of a changing magnitude of the tension in the restraint.

20. The device of claim 18 further comprising a vehicle interlock adapted to prevent operation of a vehicle until the magnitude of the tension in the restraint exceeds a predetermined magnitude.

21. The device of claim 18 further comprising a vehicle controller configured to receive the signal and release a vehicle interlock preventing operation of a vehicle based on the magnitude of the tension in the restraint.

22. The device of claim 21, wherein the magnitude of the tension in the restraint is indicative of a secured condition of the wheeled mobility device securement system.

23. The device of claim 21, wherein the vehicle controller is configured to prevent operation of the vehicle until the magnitude of the tension in the restraint exceeds a predetermined magnitude.

* * * * *